US012798648B2

(12) United States Patent
Lin

(10) Patent No.: US 12,798,648 B2
(45) Date of Patent: Nov. 17, 2026

(54) INTEGRATED POWER WHEEL

(71) Applicant: New Century Products Co., Ltd., Taipei City (TW)

(72) Inventor: Fu-Tsun Lin, Taipei City (TW)

(73) Assignee: New Century Products Co., Ltd., Taipei City (TW)

( * ) Notice: Subject to any disclaimer, the term of this patent is extended or adjusted under 35 U.S.C. 154(b) by 250 days.

(21) Appl. No.: 18/822,468

(22) Filed: Sep. 3, 2024

(65) Prior Publication Data

US 2026/0028056 A1 Jan. 29, 2026

(30) Foreign Application Priority Data

Jul. 26, 2024 (CN) ......................... 202411010002.9

(51) Int. Cl.
*B62B 9/00* (2006.01)
*B62B 5/00* (2006.01)

(52) U.S. Cl.
CPC ................ *B62B 5/004* (2013.01); *B62B 9/00* (2013.01); *B60L 2220/40* (2013.01); *B60L 2220/42* (2013.01); *B60L 2220/44* (2013.01)

(58) Field of Classification Search
CPC ....... B62B 5/04; B62B 5/0053; B62B 5/0069; B62B 9/00; B62B 27/0015; B60B 7/0013; B60B 7/0015
See application file for complete search history.

(56) References Cited

U.S. PATENT DOCUMENTS 6,787,951 B2 * 9/2004 Maslov .................. H02K 21/22
310/67 R
2019/0112002 A1 * 4/2019 Kim ......................... B62M 6/65

FOREIGN PATENT DOCUMENTS

GB 2224984 A * 5/1990 ........... B60K 7/0007

* cited by examiner

*Primary Examiner* — Tinh T Dang
(74) *Attorney, Agent, or Firm* — HDLS IPR SERVICES; Chun-Ming Shih

(57) ABSTRACT

An integrated power wheel, applicable to an electrically-assisted stroller, includes a wheel body, motor, two batteries, control circuit board, first wheel shield, second wheel shield and latch. The motor, batteries and control circuit board are integrated into the wheel body, allowing the integrated power wheel to be fitted to a conventional non-electric stroller to upgrade the latter to an electrically-assisted stroller. The first wheel shield is mountable and detachable directly and is fastened and unfastened conveniently through the latch. The integrated power wheel has advantages: enhance ease of wheel installation and use; decrease effect on stroller appearance and portability; reduce upgrade cost; increase compatibility of various conventional strollers with the integrated power wheel; enhance ease of use and maintainability through detachable wheel shields and batteries; and render wheel shields capable of being fixed in place more securely but difficult to detach because of the fastening function of a latch.

6 Claims, 6 Drawing Sheets

INTEGRATED POWER WHEEL

TECHNICAL FIELD

The present disclosure relates to power wheels, and more particularly to an integrated power wheel comprising a motor, batteries and a control circuit board which are integrated into a wheel body, adapted to be fitted to a conventional non-electrically driven stroller to upgrade it easily to an electrically-assisted stroller, and further comprising a first wheel shield not only mountable and detachable directly but also capable of being fastened and unfastened conveniently through a latch.

BACKGROUND OF THE INVENTION

Power assist systems applicable to existing electrically-assisted strollers generally fall into two categories: integrated power assist systems and additional power assist systems.

Although the integrated power assist systems are good at integration by integrating a motor, batteries and a control circuit into a stroller, they are poor in stroller compatibility and battery detachability.

The additional power assist systems are not only bulky to the detriment of the portability and beauty of electrically-assisted strollers but also poor in battery detachability.

SUMMARY

In view of the aforesaid drawbacks of the prior art, it is an objective of the disclosure to provide an integrated power wheel comprising a motor, batteries and a control circuit board, all integrated into a wheel body, allowing the integrated power wheel to be fitted to a conventional non-electrically driven stroller to upgrade the latter easily to an electrically-assisted stroller, with the integrated power wheel further comprising a first wheel shield not only mountable and detachable directly but also capable of being fastened and unfastened conveniently through a latch.

To achieve the above and other objectives, the disclosure provides an integrated power wheel applicable to an electrically-assisted stroller. The integrated power wheel comprises a wheel body, a motor, two batteries, a control circuit board, a first wheel shield, a second wheel shield and a latch. The wheel body is circumferentially enclosed by a tire. Two battery depressions, a plurality of coupling eyes and an engaging eye are disposed on one side of the wheel body. The motor is centrally coupled to the wheel body and has a rotating shaft joined to a chassis of the electrically-assisted stroller to provide auxiliary power to the electrically-assisted stroller. The batteries are removably disposed in the battery depressions. The control circuit board is disposed on the other side of the wheel body and electrically connected to the motor and the batteries. The first wheel shield has an inner side that has a plurality of coupling hooks corresponding in position to the coupling eyes. The coupling hooks are removably engaged with and coupled to the coupling eyes to allow the first wheel shield to be removably coupled to one side of the wheel body. The first wheel shield has a latch hole corresponding in position to the engaging eye. The second wheel shield is coupled to the other side of the wheel body and adapted to shield the control circuit board. The latch is movably disposed at the latch hole. The latch has an inner side that has an engaging hook. The engaging hook is engaged with and coupled to the engaging eye to allow the first wheel shield to be in a fastened state. The latch moves in a direction to cause the engaging hook to separate from an engagement position of the engaging eye, allowing the first wheel shield to be in an unfastened state.

According to the disclosure, an integrated power wheel comprises a motor, batteries and a control circuit board, all integrated into a wheel body, allowing the integrated power wheel to be fitted to a conventional non-electrically driven stroller to upgrade the latter easily to an electrically-assisted stroller, with the integrated power wheel further comprising a first wheel shield not only mountable and detachable directly but also capable of being fastened and unfastened conveniently through a latch.

On the whole, the disclosure has at least the advantages as follows:

1) enhance the ease of wheel installation and use;
2) decrease the effect on stroller appearance and portability;
3) reduce the upgrade cost;
4) increase the compatibility of various conventional strollers with the integrated power wheel of the disclosure;
5) enhance ease of use and maintainability through detachable wheel shields and batteries; and
6) render wheel shields capable of being fixed in place more securely but difficult to detach because of the fastening function of a latch.

DETAILED DESCRIPTION

Figure 1:
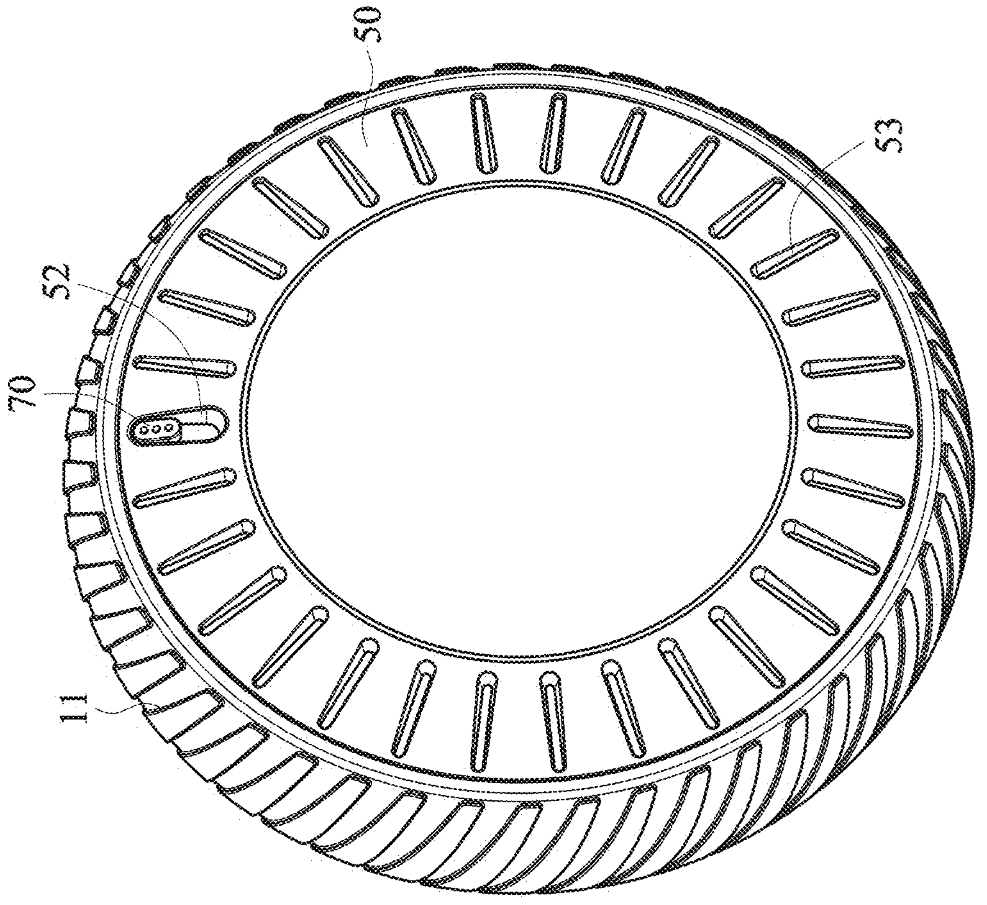
FIG. 1 is a perspective view of an integrated power wheel of the disclosure.
Figure 2:
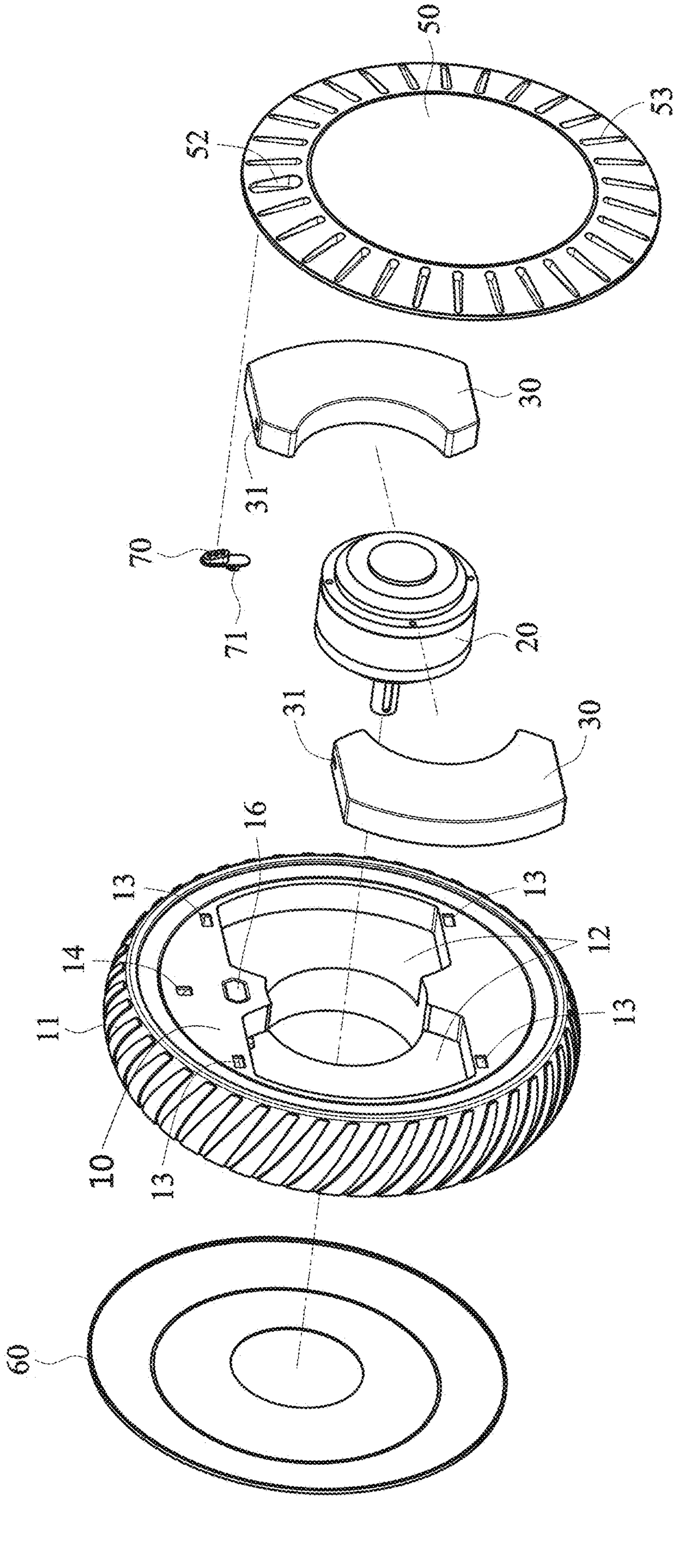
FIG. 2 is an exploded view of the integrated power wheel of the disclosure.
Figure 3:
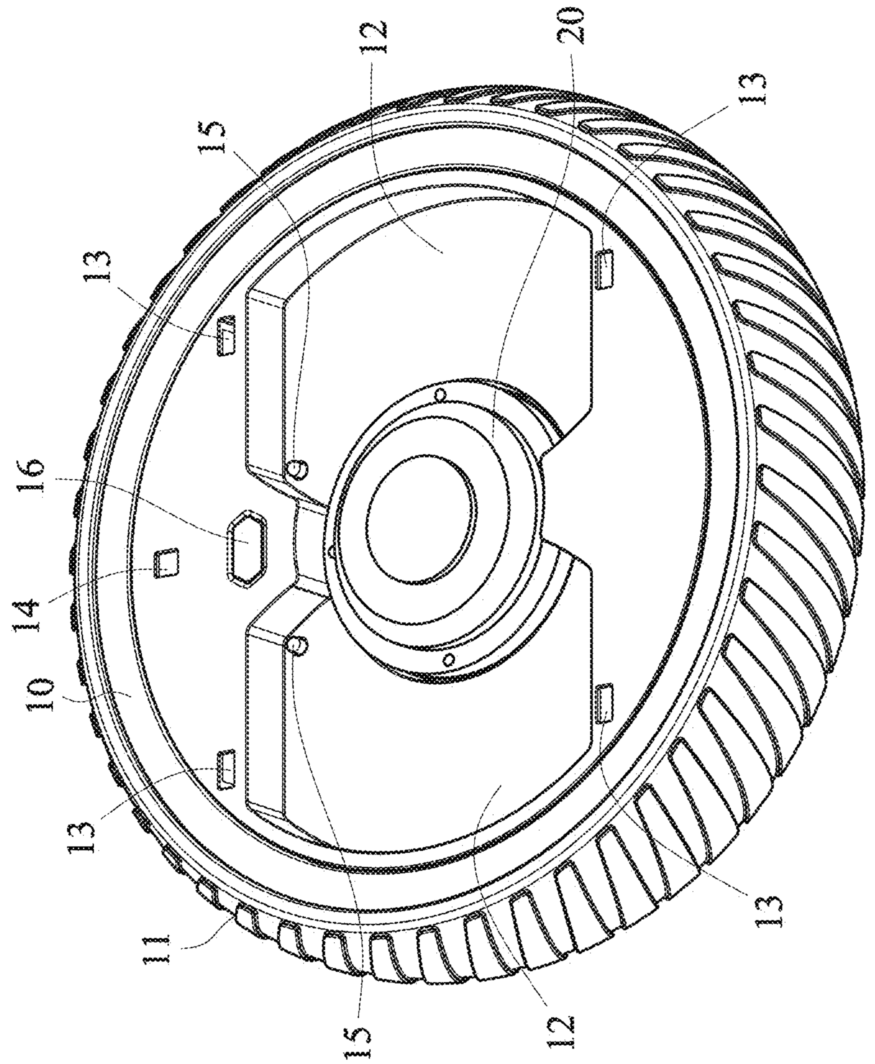
FIG. 3 is a perspective view of the integrated power wheel, with a first wheel shield removed according to the disclosure.
Figure 4:
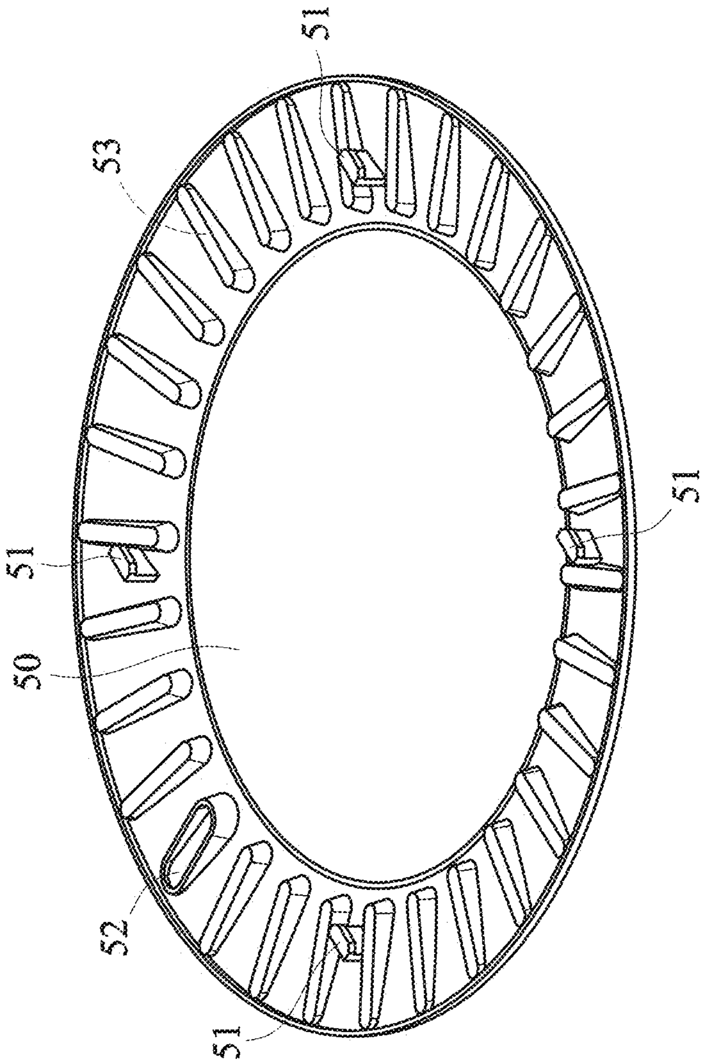
FIG. 4 is a perspective view of the integrated power wheel, showing the inner side of the first wheel shield according to the disclosure.
Figure 5:
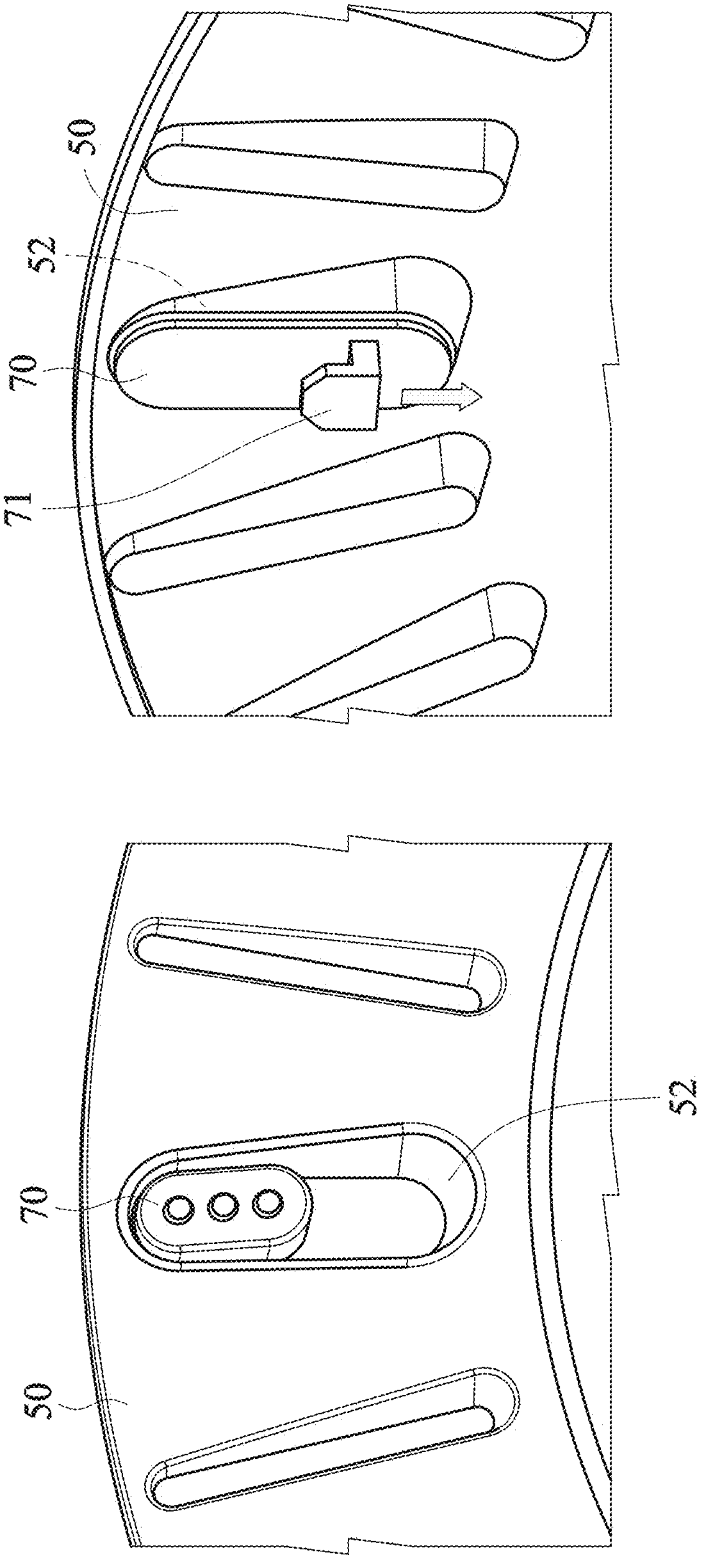
FIG. 5 is a perspective view of the integrated power wheel, showing how the first wheel shield is unfastened by a latch according to the disclosure.
Figure 6:
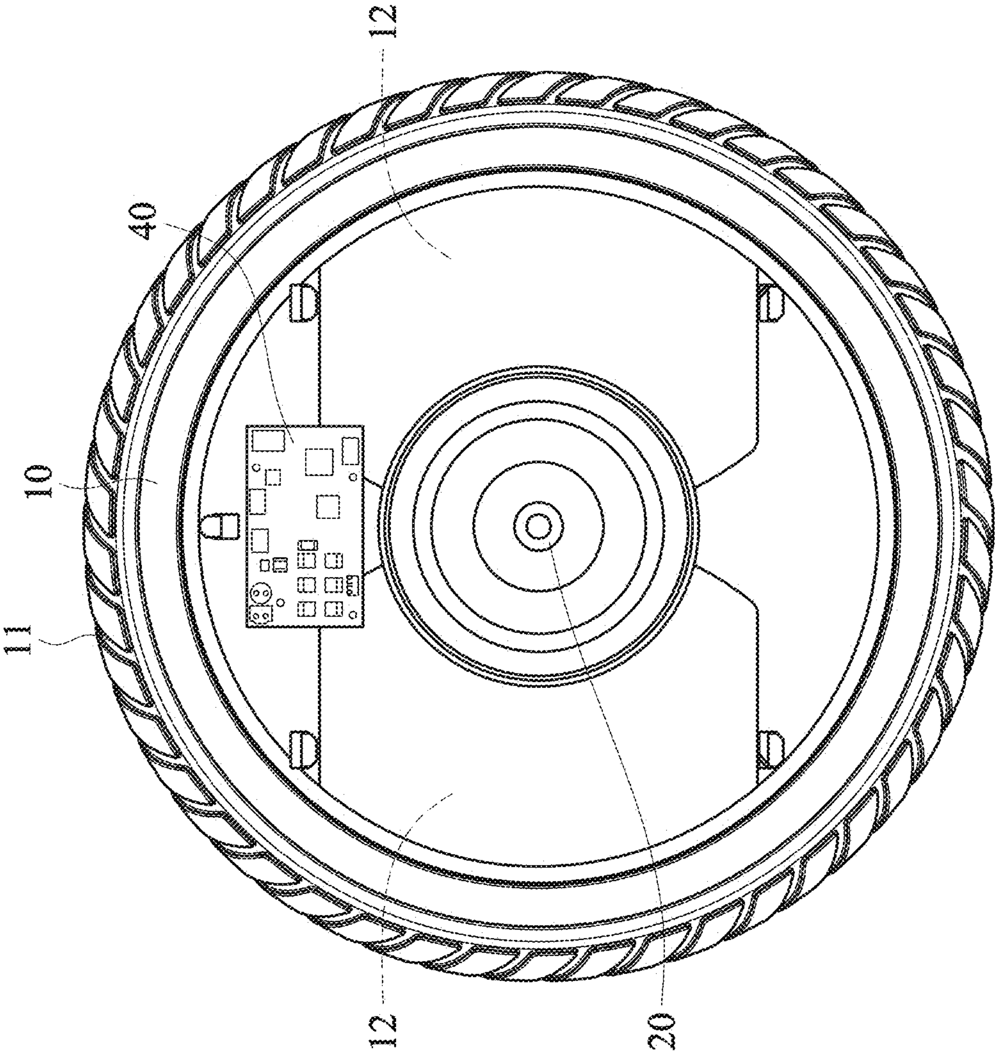
FIG. 6 is a lateral view of the integrated power wheel, with a second wheel shield removed according to the disclosure.

FIG. 1 is a perspective view of an integrated power wheel of the disclosure. FIG. 2 is an exploded view of the integrated power wheel of the disclosure. FIG. 3 is a perspective view of the integrated power wheel, with a first wheel shield removed according to the disclosure. FIG. 4 is a perspective view of the integrated power wheel, showing the inner side of the first wheel shield according to the disclosure. FIG. 5 is a perspective view of the integrated power wheel, showing how the first wheel shield is unfastened by a latch according to the disclosure. FIG. 6 is a lateral view of the integrated power wheel, with a second wheel shield removed according to the disclosure.

As shown in FIG. 1 through FIG. 6, the disclosure provides an integrated power wheel applicable to an electrically-assisted stroller. The integrated power wheel comprises a wheel body 10, a motor 20, two batteries 30, a control circuit board 40, a first wheel shield 50, a second wheel shield 60 and a latch 70.

The wheel body 10 is circumferentially enclosed by a tire 11. Two battery depressions 12, a plurality of coupling eyes 13 and an engaging eye 14 are disposed on one side of the wheel body 10.

The motor 20 is centrally coupled to the wheel body 10. The motor 20 has a rotating shaft joined to a chassis of the electrically-assisted stroller to provide auxiliary power to the electrically-assisted stroller.

The batteries 30 are removably disposed in the battery depressions 12.

The control circuit board 40 are disposed on the other side of the wheel body and electrically connected to the motor 20 and the batteries 30.

The first wheel shield 50 has an inner side that has a plurality of coupling hooks 51 corresponding in position to the coupling eyes 13 respectively. The coupling hooks 51 are removably engaged with and coupled to the coupling eyes 13 to allow the first wheel shield 50 to be removably coupled to one side of the wheel body 10. The first wheel shield 50 has a latch hole 52 corresponding in position to the engaging eye 14.

The second wheel shield 60 is coupled to the other side of the wheel body 10 and adapted to shield the control circuit board 40.

The latch 70 is movably disposed at the latch hole 52. The latch 70 has an inner side that has an engaging hook 71. The engaging hook 71 is engaged with and coupled to the engaging eye 14 to allow the first wheel shield 50 to be in a fastened state. The latch 70 moves in one direction to cause the engaging hook 71 to separate from the engagement position of the engaging eye 14, allowing the first wheel shield 50 to be in an unfastened state.

In an embodiment of the disclosure, an ejection device 15 is disposed at each of the battery depressions 12. The ejection device 15 has a resilience mechanism. The resilience mechanism enables the ejection device 15 to be resiliently pressed downward and pre-store resilience energy when the batteries 30 are disposed in the battery depressions 12. A button 16 is disposed on one side of the wheel body 10 and connected to the ejection device 15 through a link mechanism. When the button 16 is pressed, the button 16 moves the ejection device 15 such that the otherwise resiliently pressed ejection device 15 springs up and restores its original shape through the release of the otherwise pre-stored resilience energy, resiliently ejecting the batteries 30 and thus allowing the batteries 30 to be removable from the battery depressions 12.

In an embodiment of the disclosure, the batteries 30 are disposed tightly in the battery depressions 12.

Therefore, the batteries 30 can be fitted to the battery depressions 12 by a user easily and mounted therein firmly and beautifully. To change the batteries 30, the user presses the button 16 slightly to easily remove the batteries 30 from the battery depressions 12.

In an embodiment of the disclosure, an electrical connection portion 31 is disposed on one side of each of the batteries 30 and adapted to be electrically connected to the motor 20 and the control circuit board 40 to supply electric power to the motor 20.

In an embodiment of the disclosure, a plurality of grooves 53 are arranged circumferentially on the outer side of the first wheel shield 50 and extended radially outward.

Therefore, not only is the first wheel shield 50 beautiful, but the integrated power wheel also has low weight that does not come at the expense of safety, reducing manufacturing cost.

In an embodiment of the disclosure, the outer surface of the latch 70 has a coarse thread portion conducive to an increase in the friction generated as a result of the user's fingers touching the coarse thread portion.

Therefore, the user can use his or her fingers to easily push the latch 70 in one direction, for example, in a downward direction, to separate the engaging hook 71 from the engagement position of the engaging eye 14 and thereby unfasten the first wheel shield 50.

The integrated power wheel in an embodiment of the disclosure is described above. The features and advantages of the disclosure are described below.

According to the disclosure, an integrated power wheel comprises a motor, batteries and a control circuit board, all integrated into a wheel body, allowing the integrated power wheel to be fitted to a conventional non-electrically driven stroller to upgrade the latter easily to an electrically-assisted stroller, with the integrated power wheel further comprising a first wheel shield not only mountable and detachable through a plurality of coupling hooks and coupling eyes but also capable of being fastened and unfastened conveniently through a latch.

On the whole, the disclosure has at least the advantages as follows:

1) enhance the ease of wheel installation and use;
2) decrease the effect on stroller appearance and portability;
3) reduce the upgrade cost;
4) increase the compatibility of various conventional strollers with the integrated power wheel of the disclosure;
5) enhance ease of use and maintainability through detachable wheel shields and batteries; and
6) render wheel shields capable of being fixed in place more securely but difficult to detach because of the fastening function of a latch.

What is claimed is:

1. An integrated power wheel applicable to an electrically-assisted stroller, the integrated power wheel comprising:

a wheel body circumferentially enclosed by a tire, wherein two battery depressions, a plurality of coupling eyes and an engaging eye are disposed on a side of the wheel body;

a motor centrally coupled to the wheel body and having a rotating shaft joined to a chassis of the electrically-assisted stroller to provide auxiliary power to the electrically-assisted stroller;

two batteries removably disposed in the battery depressions;

a control circuit board disposed on another side of the wheel body and electrically connected to the motor and the batteries;

a first wheel shield having an inner side having a plurality of coupling hooks corresponding in position to the coupling eyes, the coupling hooks being removably engaged with and coupled to the coupling eyes to allow the first wheel shield to be removably coupled to a side of the wheel body, the first wheel shield having a latch hole corresponding in position to the engaging eye;

a second wheel shield coupled to another side of the wheel body and adapted to shield the control circuit board; and a latch movably disposed at the latch hole and having an inner side having an engaging hook, the engaging hook being engaged with and coupled to the engaging eye to allow the first wheel shield to be in a fastened state, wherein the latch moves in a direction to cause the engaging hook to separate from an engagement position of the engaging eye, allowing the first wheel shield to be in an unfastened state.

2. The integrated power wheel of claim 1, wherein each of the battery depressions has an ejection device with a resilience mechanism adapted to enable the ejection device to be resiliently pressed downward and pre-store resilience energy when the batteries are disposed in the battery depressions, wherein a button is disposed on a side of the wheel body and connected to the ejection device through a link mechanism, wherein, when the button is pressed, the button moves the ejection device such that the otherwise resiliently pressed ejection device springs up and restores its original shape through a release of the otherwise pre-stored resilience energy, ejecting the batteries resiliently and thus allowing the batteries to be removable from the battery depressions.

3. The integrated power wheel of claim 1, wherein the batteries are disposed tightly in the battery depressions.

4. The integrated power wheel of claim 1, wherein an electrical connection portion is disposed on a side of each of the batteries and adapted to be electrically connected to the motor and the control circuit board to supply electric power to the motor.

5. The integrated power wheel of claim 1, wherein a plurality of grooves are arranged circumferentially on an outer side of the first wheel shield and extended radially outward.

6. The integrated power wheel of claim 1, wherein an outer surface of the latch has a coarse thread portion conducive to an increase in friction generated through a user's fingers touching the coarse thread portion.

* * * * *